(12) United States Patent
Wybrow et al.

(10) Patent No.: US 10,562,120 B2
(45) Date of Patent: Feb. 18, 2020

(54) ELECTRICAL DISCHARGE MACHINE

(71) Applicant: SARCLAD LIMITED, South Yorkshire (GB)

(72) Inventors: Mark David Wybrow, South Yorkshire (GB); Nigel Hyde Corbett, South Yorkshire (GB)

(73) Assignee: SARCLAD LIMITED, South Yorkshire (GB)

( * ) Notice: Subject to any disclaimer, the term of this patent is extended or adjusted under 35 U.S.C. 154(b) by 288 days.

(21) Appl. No.: 15/517,157

(22) PCT Filed: Oct. 6, 2015

(86) PCT No.: PCT/GB2015/000282
§ 371 (c)(1),
(2) Date: Apr. 5, 2017

(87) PCT Pub. No.: WO2016/055755
PCT Pub. Date: Apr. 14, 2016

(65) Prior Publication Data
US 2017/0304921 A1  Oct. 26, 2017

(30) Foreign Application Priority Data
Oct. 6, 2014  (GB) .................................. 1417645.7

(51) Int. Cl.
*B23H 9/04* (2006.01)
*B23H 1/10* (2006.01)
(Continued)

(52) U.S. Cl.
CPC ................. *B23H 9/04* (2013.01); *B23H 1/10* (2013.01); *B23H 7/36* (2013.01); *B23H 11/003* (2013.01)

(58) Field of Classification Search
CPC ... B23H 1/10; B23H 7/36; B23H 9/04; B23H 11/003
See application file for complete search history.

(56) References Cited

U.S. PATENT DOCUMENTS 3,252,882 A   5/1966  Williams
3,678,240 A * 7/1972  Dietrick .................... B23H 1/10
                                              210/167.31
(Continued)

FOREIGN PATENT DOCUMENTS

DE   102010046557 A1   3/2012
EP     0304235 A2      2/1989
(Continued)

*Primary Examiner* — Geoffrey S Evans
(74) *Attorney, Agent, or Firm* — AEON Law, PLLC; Adam L. K. Philipp; Martin S. Garthwaite

(57) ABSTRACT

An EDT apparatus 1 is disclosed, comprising a dielectric fluid return system for use with an EDT machine of the type in which the workpiece is not submersed in dielectric fluid. The return system comprises a first collector 19 for catching spills from a dielectric bath 9 associated with a set of electrodes 10 which apply electrical pulses to the workpiece through the dielectric fluid in the bath. Also, a separate, second collector 21 is positioned substantially beneath the workpiece and arranged both to receive fluid from the first collector 19 and to catch fluid that drips from the workpiece itself, the second collector being connected to a pump 13 which returns the fluid from the second collector to the dielectric bath.

16 Claims, 3 Drawing Sheets

(51) Int. Cl.
*B23H 7/36* (2006.01)
*B23H 11/00* (2006.01)

(56) References Cited

U.S. PATENT DOCUMENTS

| | | | | |
|---|---|---|---|---|
| 5,034,589 A * | 7/1991 | Evans | ............... | B23H 1/028 |
| | | | | 219/69.17 |
| 5,036,173 A * | 7/1991 | Wilson | ............... | B23H 9/04 |
| | | | | 219/69.11 |
| 6,284,994 B1 | 9/2001 | Cross | | |
| 6,489,582 B1 * | 12/2002 | Roedl | ............... | B23H 1/00 |
| | | | | 219/69.17 |

FOREIGN PATENT DOCUMENTS

GB         1519127 A    7/1978
WO    2014068680 A1    5/2014

\* cited by examiner

ELECTRICAL DISCHARGE MACHINE

FIELD OF THE INVENTION

The present invention relates to an electrical discharge machine for machining or applying a finish to a surface of a workpiece.

BACKGROUND TO THE INVENTION

Electrical discharge machines are used to machine or apply a finish to the surface of a workpiece using electrical discharge texturing (EDT). For example, EDT is used to apply a textured or matt finish to the surface of a work roll. The work roll is used in the rolling of metallic products to produce on the products a complementary textured or matt finish.

A known EDT machine for work rolls comprises a workpiece mounting arrangement comprising mounting parts (headstock, tailstock and steadies) which support and rotate the roll about a roll axis. An electrode head carries an array of electrodes supported within a block of insulating material. The head is positioned to one side of the workpiece, and is moveable, for example by a servo-motor, towards and away from the work roll and is supported by a housing. The housing comprises electrical connections for coupling each electrode to an individual source of pulsed direct current. In use, a gap is defined between the electrodes and the workpiece surface to define a gap. A bath of dielectric fluid is provided so that said fluid is present in the gap. By applying electrical pulses to the electrodes in a controlled manner, electricity flows between the electrodes and the roll surface creating a spark which creates the textured or matt finish.

A collecting bath is provided behind the dielectric bath to catch overspill as the bath is replenished, which overspill is subsequently transmitted back into the bath.

A problem exists however in that fluid which falls from the workpiece itself is not collected efficiently, resulting in wastage, as well as splashing over various surfaces of the machine.

SUMMARY OF THE INVENTION

A first aspect of the invention provides an EDT apparatus for producing a textured or matt finish on the surface of an electrically-conductive workpiece, the machine comprising: a workpiece mount for mounting a workpiece, at least one electrode mounted on a carrier that in use is spaced from a mounted workpiece surface to define a gap across which electrical pulses are transmitted, a dielectric bath for holding dielectric fluid and arranged to provide dielectric fluid between the electrode(s) and the workpiece surface, a return system for transmitting dielectric fluid which spills from the dielectric bath back to said bath, and a separate drip bath spaced from, and positioned below, the workpiece for collecting dielectric fluid that falls directly from the workpiece and which communicates with, or forms part of, the return system so that the collected fluid can be returned to the dielectric bath.

The drip bath may be positioned substantially underneath the workpiece for collecting dielectric fluid that falls substantially vertically from the workpiece in use.

A funnel or sloping surface may be provided between the workpiece and the drip bath for funnelling dielectric fluid into the bath. In this case, the drip bath may be off-centre from the workpiece (but still below) with the funnel diverting drip fluid to the bath.

The return system may comprise a spill bath for catching dielectric fluid that spills from the dielectric bath and a pump that pumps the fluid back to the dielectric bath, wherein the drip bath is arranged between the spill bath and the pump so that fluid from the spill bath is received first into the drip bath below the workpiece and the fluid within the drip bath is then transmitted back to the dielectric bath via the pump.

The spill bath may comprise a sloping lower surface oriented towards an outlet pipe which feeds the drip bath so that dielectric fluid received in the spill bath flows into the drip bath due to gravity.

The drip bath may be provided with a sensor arranged to sense when the dielectric fluid reaches a certain level or quantity at which time the pump is arranged to pump collected fluid from the drip bath back to the dielectric bath.

The workpiece support may be comprised of a first steady and an opposed second steady defining a workpiece axis between the two steadies, both steadies being connected on a bed beneath the workpiece axis, wherein the bed is of reduced dimensions between the two steadies with the drip bath being mounted on, over, adjacent or under said reduced part of the bed.

The drip bath may have a sloping wall arranged in use to urge collected fluid towards an outlet pipe connected to the pump.

The drip bath may be elongate, extending beneath substantially the entire length of the workpiece surface being finished by the apparatus.

A second aspect of the invention provides an EDT apparatus comprising a dielectric fluid return system for use with an EDT machine of the type in which the workpiece is not submersed in dielectric fluid, the return system comprising a first collector for catching spills from a dielectric bath associated with a set of electrodes which apply electrical pulses to the workpiece through the dielectric fluid in the bath, a separate, second collector positioned substantially beneath the workpiece and arranged both to receive fluid from the first collector and to catch fluid that drips from the workpiece, the second collector being connected to a pump which returns the fluid from the second collector to the dielectric bath.

A third aspect provides a method of recycling dielectric fluid used in an EDT apparatus of the type in which the workpiece is not entirely or substantially submerged in dielectric fluid, the method comprising:
  pumping dielectric fluid into a dielectric bath associated with an EDT texture station;
  catching overspill from the dielectric bath within a first bath;
  catching dielectric fluid that drips from the workpiece within a second bath generally located beneath the workpiece; and
  feeding the dielectric fluid caught in the first and second baths back to the dielectric bath.

The overspill caught in the first bath may be fed to the second bath and wherein the combined fluid in the second bath may then be fed back to the dielectric bath.

BRIEF DESCRIPTION OF THE DRAWINGS

The invention will now be described by way of example only with reference to the accompanying diagrammatic drawings in which.

DETAILED DESCRIPTION OF THE INVENTION

The embodiment described herein is an EDT machine for applying a finish to the surface of a workpiece, particularly a work roll. The machine is of the spark erosion type, i.e. one having a pulsed DC current, typically greater than 1 kHz. The machine is the type in which the workpiece is not entirely or substantially submersed in dielectric fluid, as is the case for some EDT machines. A texture station is positioned above ground level, to one side of the workpiece, carrying a plurality of electrodes in an electrode array. The position of the texture station relative to the workpiece is controlled, e.g. using servo motors, so that there is a gap between the electrodes and the surface of the workpiece. A bath of dielectric fluid which is part of, or associated with, the texture station applies dielectric fluid within the gap through a seal so that electrical pulses transmitted to the electrodes causes sparks to be transmitted through the dielectric fluid which effect the finish. A headstock rotates the workpiece, whilst steadies support the workpiece and provide an electrical return path. The steadies are each movable on sliding rails to allow for different workpiece geometries. In some cases the texture station moves along the longitudinal axis, parallel with the workpiece, so that the surface is appropriately textured.

The dielectric bath is replenished with dielectric fluid using a return system; as dielectric fluid is fed into the bath, excess fluid flows over a weir at the back of the bath and is fed by gravity into a tank below ground level and is then pumped back into the dielectric bath. Fluid is replenished to promote movement within the dielectric bath.

Further background information is described in Applicant's patent application numbers EP0294082, EP0304235, EP0373154 and EP0371962 which are incorporated herein by reference.

In such EDT machines in which the texture station seals against the workpiece in order to contain the dielectric fluid, it is inevitable that some fluid will leak past the seal and will adhere to the surface of the workpiece, aided by the surface roughness imparted by the EDT process itself. The containment is effected by a soft seal, meaning that the seal acts like a squeegee, wiping the dielectric fluid off the surface of the workpiece. Fluid on the workpiece presents an issue, because dielectric on the surface typically falls at two different points, which are (i) at the bath seal due to the squeegee effect, and (ii) when the workpiece is particularly wet, from the bottom of the workpiece directly below the roll axis. This results in wastage and splashing.

An improved EDT machine 1 is now described.

Figure 1:
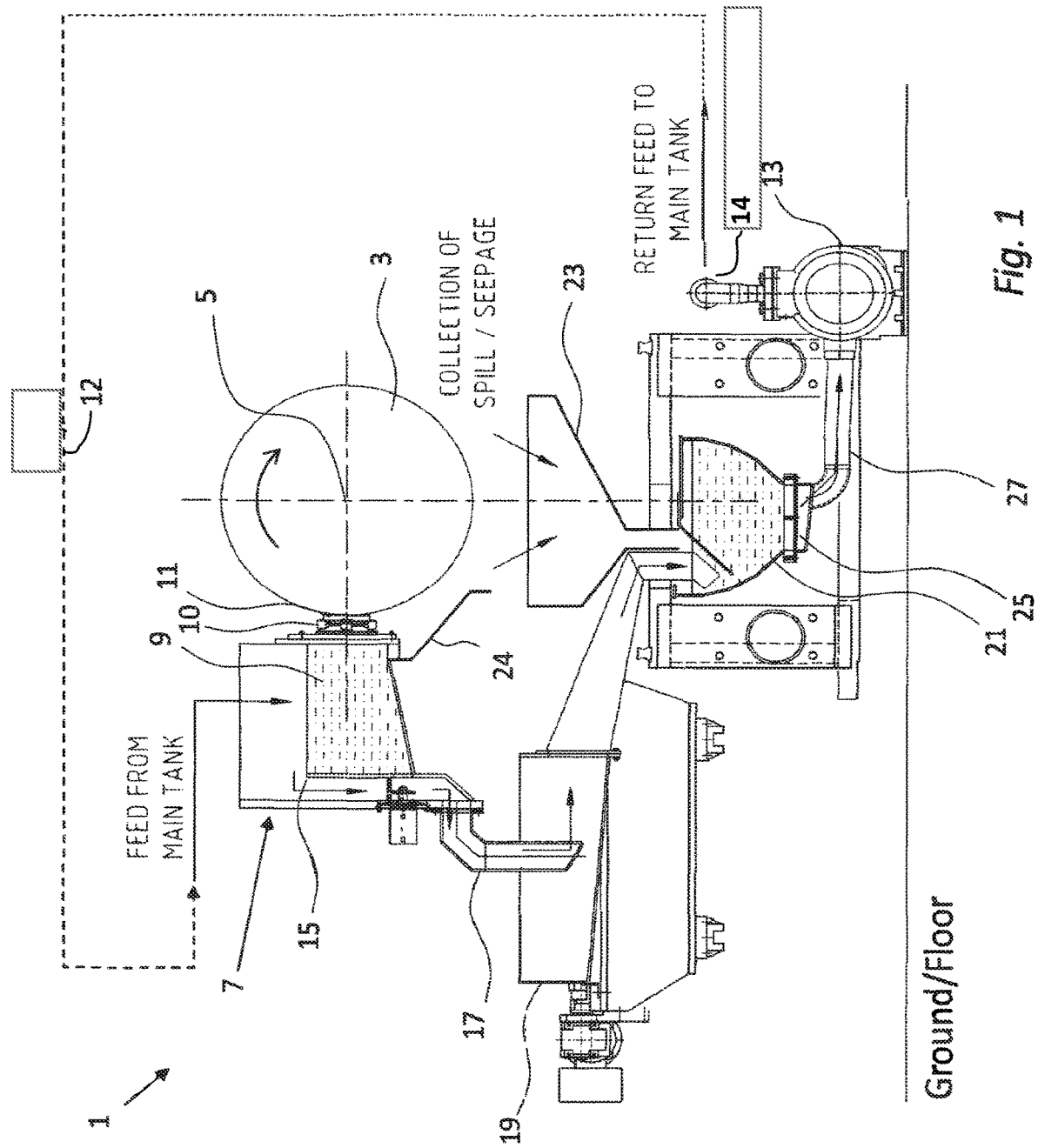
FIG. 1 is a schematic cross-sectional view of an EDT machine in accordance with the invention, in which a roll is also shown.

Referring to FIG. 1, a cross-section of the EDT machine 1 according to an embodiment of the invention is shown. Although it does not form part of the machine 1, a work roll 3 is shown in mounted position which is useful for understanding the machine's operation. The roll 3 is supported in position between two end steadies (not shown) and a headstock which rotates the roll about its central axis 5 in the direction indicated. Collectively, these may be referred to as the machine furniture.

A saddle which is normally present between the steadies, connecting their lower ends and passing beneath the workpiece 3 is omitted in machine 1. Its omission facilitates an open space beneath the workpiece area which advantageously allows for the introduction of a drip bath 21 beneath the workpiece providing a central collection point, as will be explained.

A texture station 7 is mounted adjacent one side of the work roll 3 and comprises a dielectric bath 9 for holding dielectric fluid, an electrode head 10 carrying an array of electrodes, and a soft seal 11 which surrounds the electrode array and in use makes contact with the work roll 3 so that the gap between the electrodes and the work roll surface can be filled with an enclosed volume of dielectric fluid. The location and general operation of the texture station 7 is conventional.

A return path 12 is indicated schematically. This indicates a return flow of dielectric fluid from a pump 13 which can be located at or above floor level, via return feed pipe 14. It will be appreciated that the dielectric bath 9 is replenished. An overall return circuit will be described later on.

A weir 15 is provided at the rear of the dielectric bath 9, so that, as the bath is replenished, fluid overflows the weir to maintain a predetermined level. The excess fluid is channelled by means of a pipe 17 into a spill bath 19 located generally beneath the texture station 7. The spill bath 19 has a sloping floor which, using gravity, urges the dielectric fluid towards an outlet pipe to the right hand side of said bath (as viewed in FIG. 1) with the pipe channelling the fluid to the central drip bath 21.

As mentioned, in the space beneath the central axis of the roll 3 is positioned the drip bath 21, which is separate from the spill bath 19. The outlet pipe from the spill bath 19 extends through an opening into the drip bath 21 via an aperture at the top. The upper part of the drip bath 21 can be open but in this case is partially closed-off.

The drip bath 21 is a generally trough-shaped receptacle that (when viewed from the side) is longitudinal and extends along substantially, or the majority of, the space between the steadies. This means that the drip bath 21 can extend beneath substantially the entire length of the roll 3 or at least the part that is being textured. The drip bath 21 is substantially beneath the roll, but can be off-centre to some degree, as is the case in FIG. 1.

Mounted above the drip bath 21 is a drip funnel 23 configured to collect and funnel into the drip bath dielectric fluid from the bottom of the roll 3, and fluid expelled due to the squeegee effect of the seal 11. The drip funnel 23 is likewise longitudinal in side view.

A sloping drip guard 24 is mounted to the underside of the texture station 7 and slopes downwards and inwards towards the funnel 23 at a relatively steep angle, passing beneath the seal 11. This is so that drips from the seal 11 fall onto the guard 24 and are diverted into the top of drip funnel 23 and then into the drip bath 21. The steeper the slope of drip guard 24, the less splashing. A relatively steep angle is selected which significantly lessens or even eliminates splashing onto other parts of the machine. Similarly, the lowering of the centreline height of the machine reduces velocity on impact. The sloping sides of the funnel 23 are similarly angled to reduce impact velocity and reduce splashing.

Alternatively, the drip guard 24 could channel, e.g. using a pipe, to the pipe 17.

In general summary, therefore, the space left by omitting the saddle between the steadies is utilised to providing a drip bath 21 generally below the centreline of the roll 3 which is arranged to collect dielectric fluid (i) fed from the spill bath 19, (ii) that falls from the seal 11 as the roll rotates, and (iii) that falls directly from the lower surface of the roll 3. It also allows the roll centreline to machine base distance to be reduced.

The funnel 23 is employed to assist capture of fluid in respect of (ii) and (iii) above. The longitudinal extent of the drip bath 21 also provides efficient capture and recycling of the dielectric fluid.

The drip bath 21 therefore acts as a single, central collection point and is provided within the circuit of the overall return system. The floor 25 of the drip bath 21 is sloped to direct collected fluid through an outlet pipe 27 to the aforementioned pump 13 which returns the fluid back to the dielectric bath 9 via path 12.

Figure 3:
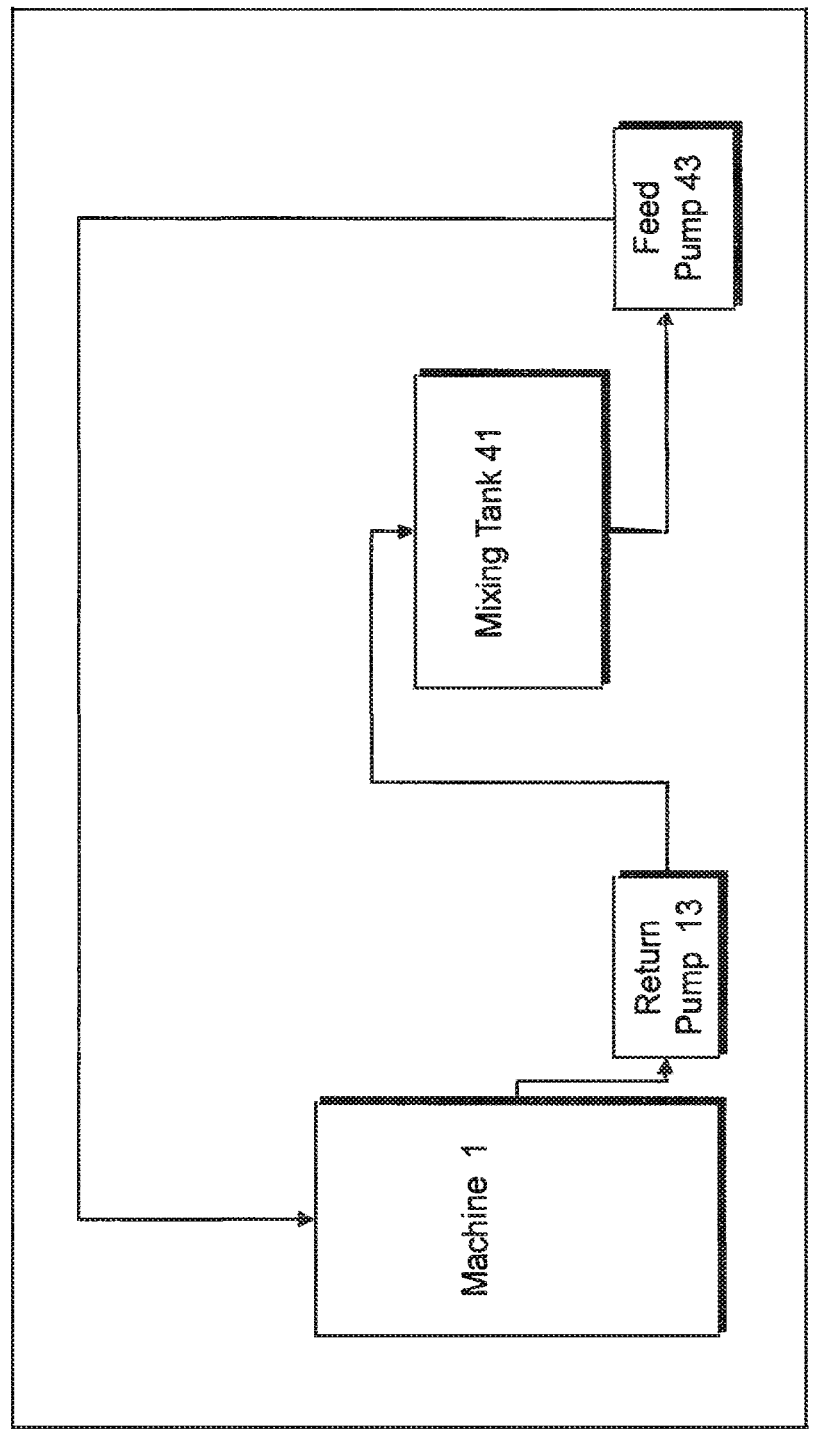
FIG. 3 is a schematic diagram of an overall dielectric fluid return system, which is useful for understanding the invention.

In some embodiments, further components are present in the return path 12, as indicated in FIG. 3. Specifically, between the return pump 13 and the dielectric bath 9 can be provided a mixing tank 41 and a feed pump 43. Here, the fluid from the drip bath 21 is pumped first into the mixing tank 41, which incorporates a mixer, and then pumped by a further, feed pump 43 to the dielectric bath 9.

A control system (not shown) may be provided to control the return path flow. For example, a level sensor may be present within the drip bath 21 for sensing when the collected dielectric fluid reaches a certain level. When the predetermined level is detected, the pump 13 at this point can be initiated to remove collected fluid and replenish the dielectric bath 9, before shutting down to allow the drip bath 21 to accumulate fluid as before.

The drip bath 21 can be provided at or above floor level, as all of the gravity return distances are relatively small. The return pump 13 can also therefore be above floor level. This in turn means that the machine 1 can be installed on a level floor, reducing the project costs to the end user. Further, omitting of the saddle reduces material costs.

Finally, it will be appreciated that, whilst the drip funnel 23 is shown in the preferred embodiment as a means to efficiently divert fluid from two drip sources towards the drip bath 21, in theory this can be removed if the drip bath 21 is sufficiently wide.

Figure 2:
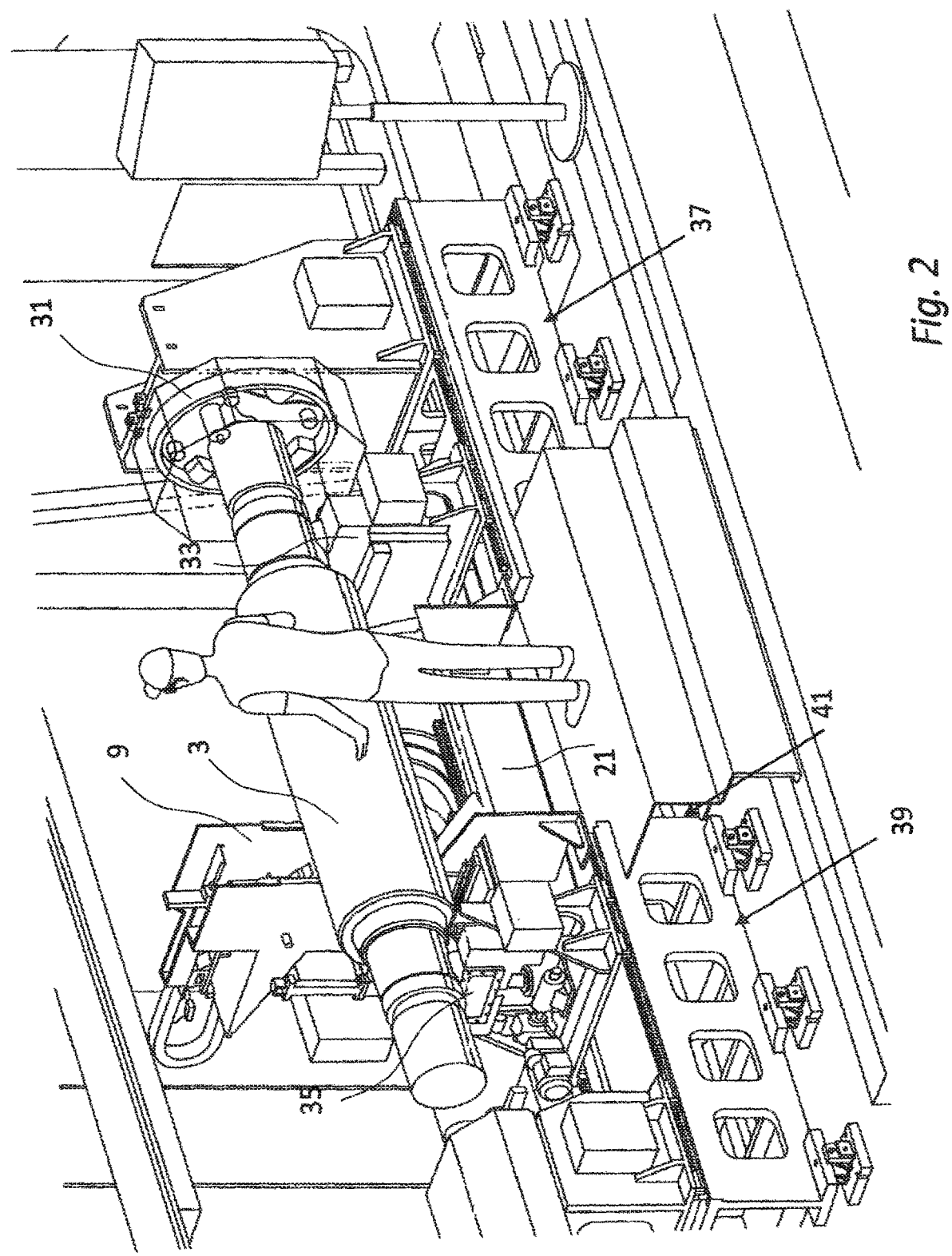
FIG. 2 is a perspective graphic view of the FIG. 1 machine.

FIG. 2 shows the FIG. 1 EDT machine 1 in perspective view, with an operator and the workpiece 3 shown positioned between a headstock 31 and supported by first and second steadies 33, 35. The dielectric bath 9 and the drip funnel 23 are indicated also, with their proximal walls omitted for ease of reference. It will further be noted that the steadies 33, 35 are mounted on respective mounts 37, 39; in this case, the steadies can be moved relative to their mount using tracks. Between the mounts 37, 39 is a space 41 within which, in this embodiment, the drip bath (amongst other possibilities) can be conveniently located.

The above described embodiments are suitable for producing a textured finish on work rolls. However, the embodiments are also applicable to other types of roll, e.g. bridle rolls and looper rolls.

It will be appreciated that the above described embodiments are purely illustrative and are not limiting on the scope of the invention. Other variations and modifications will be apparent to persons skilled in the art upon reading the present application.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

The invention claimed is:

1. An electric discharge texturing ("EDT") apparatus for producing a textured or matt finish on the surface of an electrically-conductive roll workpiece, the machine comprising:
a rotatable mount for mounting a roll workpiece,
at least one electrode mounted on a carrier that in use is spaced from a mounted workpiece surface to define a gap across which electrical pulses are transmitted,
a dielectric bath for holding dielectric fluid and arranged to provide dielectric fluid between the electrode(s) and the workpiece surface,
a dielectric fluid return system for transmitting dielectric fluid which spills from the dielectric bath back to the dielectric bath via a return feed pipe, and
a separate drip bath spaced from, and positioned below, the workpiece for collecting dielectric fluid that falls from the workpiece and which communicates with the dielectric fluid return system so that the collected fluid can be returned to the dielectric bath.

2. Apparatus according to claim 1, wherein the drip bath is positioned substantially underneath the workpiece for collecting dielectric fluid that falls substantially vertically from the workpiece in use.

3. Apparatus according to claim 1, further comprising a funnel positioned between the workpiece and the drip bath for funnelling dielectric fluid into the bath.

4. Apparatus according to claim 1, further comprising a seal positioned adjacent the electrode(s) which in use makes contact with the workpiece, and a drip guard having a sloping surface that extends below the position of contact in order to urge dielectric fluid into the drip bath.

5. Apparatus according to claim 1, wherein the dielectric fluid return system comprises a spill bath for catching dielectric fluid that spills from the dielectric bath and a pump that pumps the fluid back to the dielectric bath, wherein the drip bath is arranged between the spill bath and the pump so that fluid from the spill bath is received first into the drip bath below the workpiece and the fluid within the drip bath is then transmitted back to the dielectric bath via the pump and a pipe.

6. Apparatus according to claim 5, wherein the spill bath comprises a sloping lower surface oriented towards an outlet which feeds into the drip bath so that dielectric fluid received in the spill bath flows into the drip bath due to gravity.

7. Apparatus according to claim 1, wherein the drip bath is provided with a sensor arranged to sense when the dielectric fluid reaches a certain level or quantity at which time the pump is arranged to pump collected fluid from the drip bath back to the dielectric bath.

8. Apparatus according to claim 1, further comprising a workpiece support comprised of a first steady and an opposed second steady defining a workpiece axis between the two steadies, both steadies being connected on a bed beneath the workpiece axis, wherein the bed is of reduced dimensions between the two steadies with the drip bath being mounted on, over, partially under or adjacent said reduced part of the bed.

9. Apparatus according to claim 1, wherein the drip bath has a sloping wall arranged in use to urge collected fluid towards an outlet channel connected to the pump.

10. Apparatus according to claim 1, wherein the drip bath is elongate, extending beneath substantially the entire, or major part of the, length of the workpiece surface being finished by the apparatus.

11. An apparatus for applying electrical pulses to a rotating roll comprising a dielectric fluid return system for use with an electric discharge texturing ("EDT") machine of a type in which the roll workpiece is not submersed in dielectric fluid, the dielectric fluid return system comprising a first collector for catching spills from a dielectric bath associated with a set of electrodes which apply electrical pulses to the workpiece through the dielectric fluid in the bath, a separate, second collector positioned substantially beneath the rotating roll workpiece and arranged both to receive fluid from the first collector and to catch fluid that drips from the workpiece, the second collector being connected to a pump which returns the fluid from the second collector to the dielectric bath via a return feed pipe.

12. Apparatus according to claim 11, further comprising a seal for containing a volume of dielectric fluid in the gap between the electrodes and the work surface, and a drip guard in the form of a sloping surface extending beneath the seal for diverting falling fluid towards and into the second collector.

13. Apparatus according to claim 11, further comprising a funnel mounted between the workpiece and the second collector.

14. Apparatus according to claim 13, wherein the second collector and funnel are both longitudinal, extending along all or the majority of the length of a workpiece.

15. A method of recycling dielectric fluid used in an electric discharge texturing ("EDT") apparatus in which a workpiece is a rotatably mounted roll that is not entirely or substantially submerged in dielectric fluid, the method comprising:
  pumping dielectric fluid into a dielectric bath associated with an EDT texture station;
  catching overspill from the dielectric bath within a first bath;
  catching dielectric fluid that drips from the workpiece within a second bath located beneath the workpiece; and
  feeding the dielectric fluid caught in the first and second baths back to the dielectric bath.

16. A method according to claim 15, wherein the overspill caught in the first bath is fed to the second bath and wherein the combined fluid in the second bath is fed back to the dielectric bath.

* * * * *